United States Patent
Waser et al.

(10) Patent No.: US 10,989,726 B2
(45) Date of Patent: Apr. 27, 2021

(54) LABORATORY SAMPLE DISTRIBUTION SYSTEM AND METHOD OF OPERATING A LABORATORY SAMPLE DISTRIBUTION SYSTEM

(71) Applicant: Roche Diagnostics Operations, Inc., Indianapolis, IN (US)

(72) Inventors: Patrick Waser, Lucerne (CH); Hans Schneider, Schwaikheim (DE); Daniel Arnold, Zug (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 211 days.

(21) Appl. No.: 16/201,356

(22) Filed: Nov. 27, 2018

(65) Prior Publication Data
US 2019/0094252 A1    Mar. 28, 2019

Related U.S. Application Data

(63) Continuation of application No. PCT/EP2017/063523, filed on Jun. 2, 2017.

(30) Foreign Application Priority Data

Jun. 9, 2016    (EP) .................................... 16173771

(51) Int. Cl.
*G01N 35/04*    (2006.01)
*G01N 35/00*    (2006.01)
(Continued)

(52) U.S. Cl.
CPC ................ *G01N 35/04* (2013.01); *B01L 3/50* (2013.01); *B65G 54/025* (2013.01);
(Continued)

(58) Field of Classification Search
CPC .... B01L 2200/028; G01N 2035/00881; G01N 35/00871; G05B 2219/21028; G05B 2219/21039; G05B 2219/21091
See application file for complete search history.

(56) References Cited

U.S. PATENT DOCUMENTS 3,273,727 A    9/1966    Rogers et al.
3,653,485 A    4/1972    Donlon
(Continued)

FOREIGN PATENT DOCUMENTS

CN    201045617 Y    4/2008
CN    102109530 A    6/2011
(Continued)

OTHER PUBLICATIONS

Igret, Radu, Wiring Guidelines for RS-485 networks, BobTech Embedded Controls, 2011, 4 pp., Revision A.
(Continued)

*Primary Examiner* — Eric S. McCall
*Assistant Examiner* — Timothy P Graves
(74) *Attorney, Agent, or Firm* — Roche Diagnostics Operations, Inc.

(57) ABSTRACT

A laboratory sample distribution system comprising sample container carriers, a central controller having a network interface, and transport modules is presented. Each transport module comprises a transport surface, wherein the transport surfaces form a transport plane, a controllable driver arranged below the transport surface and configured to move sample container carriers on the transport surface, and a control unit for controlling the driver. The control unit comprises a network interface. The central controller and the control units of the transport modules are connected by their corresponding network interfaces. Each control unit comprises first and second addressing terminals. The addressing
(Continued)

terminals are connected sequentially in a daisy chain topology. The first addressing terminal is the first control unit in the sequence and is connected to a first reference potential and the second addressing terminal is the last control unit in the sequence and is connected to a second reference potential.

5 Claims, 2 Drawing Sheets

(51) Int. Cl.
    *G05B 19/042*     (2006.01)
    *B65G 54/02*     (2006.01)
    *B01L 3/00*     (2006.01)

(52) U.S. Cl.
    CPC ..... *G01N 35/00871* (2013.01); *G05B 19/042* (2013.01); *B01L 2200/028* (2013.01); *G01N 2035/00881* (2013.01); *G01N 2035/0406* (2013.01); *G01N 2035/0441* (2013.01); *G01N 2035/0477* (2013.01); *G05B 19/0426* (2013.01); *G05B 2219/21028* (2013.01); *G05B 2219/21039* (2013.01); *G05B 2219/21091* (2013.01); *G05B 2219/25257* (2013.01); *G05B 2219/2656* (2013.01); *G05B 2219/2657* (2013.01)

(56) References Cited

U.S. PATENT DOCUMENTS

| | | |
|---|---|---|
| 3,901,656 A | 8/1975 | Durkos et al. |
| 4,150,666 A | 4/1979 | Brush |
| 4,395,164 A | 7/1983 | Beltrop et al. |
| 4,544,068 A | 10/1985 | Cohen |
| 4,771,237 A | 9/1988 | Daley |
| 5,120,506 A | 6/1992 | Saito et al. |
| 5,295,570 A | 3/1994 | Grecksch et al. |
| 5,309,049 A | 5/1994 | Kawada et al. |
| 5,457,368 A | 10/1995 | Jacobsen et al. |
| 5,523,131 A | 6/1996 | Isaacs et al. |
| 5,530,345 A | 6/1996 | Murari et al. |
| 5,636,548 A | 6/1997 | Dunn et al. |
| 5,641,054 A | 6/1997 | Mori et al. |
| 5,651,941 A | 7/1997 | Stark et al. |
| 5,720,377 A | 2/1998 | Lapeus et al. |
| 5,735,387 A | 4/1998 | Polaniec et al. |
| 5,788,929 A | 8/1998 | Nesti |
| 6,045,319 A | 4/2000 | Uchida et al. |
| 6,062,398 A | 5/2000 | Thalmayr |
| 6,141,602 A | 10/2000 | Igarashi et al. |
| 6,151,535 A | 11/2000 | Ehlers |
| 6,184,596 B1 | 2/2001 | Ohzeki |
| 6,191,507 B1 | 2/2001 | Peltier et al. |
| 6,206,176 B1 | 3/2001 | Blonigan et al. |
| 6,255,614 B1 | 7/2001 | Yamakawa et al. |
| 6,260,360 B1 | 7/2001 | Wheeler |
| 6,279,728 B1 | 8/2001 | Jung et al. |
| 6,293,750 B1 | 9/2001 | Cohen et al. |
| 6,429,016 B1 | 8/2002 | McNeil |
| 6,444,171 B1 | 9/2002 | Sakazume et al. |
| 6,571,934 B1 | 6/2003 | Thompson et al. |
| 6,738,920 B1 * | 5/2004 | Horne ................ G05B 19/0423 |
| 7,028,831 B2 | 4/2006 | Veiner |
| 7,078,082 B2 | 7/2006 | Adams |
| 7,122,158 B2 | 10/2006 | Itoh |
| 7,278,532 B2 | 10/2007 | Martin |
| 7,326,565 B2 | 2/2008 | Yokoi et al. |
| 7,425,305 B2 | 9/2008 | Itoh |
| 7,428,957 B2 | 9/2008 | Schaefer |
| 7,578,383 B2 | 8/2009 | Itoh |
| 7,597,187 B2 | 10/2009 | Bausenwein et al. |
| 7,746,229 B2 | 6/2010 | Graeter et al. |
| 7,850,914 B2 | 12/2010 | Veiner et al. |
| 7,858,033 B2 | 12/2010 | Itoh |
| 7,875,254 B2 | 1/2011 | Garton et al. |
| 7,939,484 B1 | 5/2011 | Loeffler et al. |
| 8,240,460 B1 | 8/2012 | Bleau et al. |
| 8,281,888 B2 | 10/2012 | Bergmann |
| 8,502,422 B2 | 8/2013 | Lykkegaard |
| 8,796,186 B2 | 8/2014 | Shirazi |
| 8,833,544 B2 | 9/2014 | Stoeckle et al. |
| 8,973,736 B2 | 3/2015 | Johns et al. |
| 9,056,720 B2 | 6/2015 | Van De Loecht et al. |
| 9,097,691 B2 | 8/2015 | Onizawa et al. |
| 9,187,268 B2 | 11/2015 | Denninger et al. |
| 9,211,543 B2 | 12/2015 | Ohga et al. |
| 9,239,335 B2 | 1/2016 | Heise et al. |
| 9,423,410 B2 | 8/2016 | Buehr |
| 9,423,411 B2 | 8/2016 | Riether |
| 9,567,167 B2 | 2/2017 | Sinz |
| 9,575,086 B2 | 2/2017 | Heise et al. |
| 9,593,970 B2 | 3/2017 | Sinz |
| 9,598,243 B2 | 3/2017 | Denninger et al. |
| 9,618,525 B2 | 4/2017 | Malinowski et al. |
| 9,658,241 B2 | 5/2017 | Riether et al. |
| 9,664,703 B2 | 5/2017 | Heise et al. |
| 9,772,342 B2 | 9/2017 | Riether |
| 9,791,468 B2 | 10/2017 | Riether et al. |
| 9,810,706 B2 | 11/2017 | Riether et al. |
| 9,902,572 B2 | 2/2018 | Mahmudimanesh et al. |
| 9,939,455 B2 | 4/2018 | Schneider et al. |
| 9,952,242 B2 | 4/2018 | Riether |
| 9,969,570 B2 | 5/2018 | Heise et al. |
| 9,989,547 B2 | 6/2018 | Pedain |
| 10,006,927 B2 | 6/2018 | Sinz et al. |
| 10,012,666 B2 | 7/2018 | Riether |
| 10,031,150 B2 | 7/2018 | Heise et al. |
| 10,094,843 B2 | 10/2018 | Malinowski et al. |
| 10,119,982 B2 | 11/2018 | Baer |
| 10,126,317 B2 | 11/2018 | Heise et al. |
| 10,160,609 B2 | 12/2018 | Malinowski |
| 10,288,634 B2 | 5/2019 | Kaeppeli |
| 10,821,444 B2 | 11/2020 | Danehy et al. |
| 2002/0009391 A1 | 1/2002 | Marquiss et al. |
| 2003/0092185 A1 | 5/2003 | Qureshi et al. |
| 2004/0050836 A1 | 3/2004 | Nesbitt et al. |
| 2004/0084531 A1 | 5/2004 | Itoh |
| 2005/0061622 A1 | 3/2005 | Martin |
| 2005/0109580 A1 | 5/2005 | Thompson |
| 2005/0194333 A1 | 9/2005 | Veiner et al. |
| 2005/0196320 A1 * | 9/2005 | Veiner ................ G01N 35/04 |
| 2005/0226770 A1 | 10/2005 | Allen et al. |
| 2005/0242963 A1 | 11/2005 | Oldham et al. |
| 2005/0247790 A1 | 11/2005 | Itoh |
| 2005/0260101 A1 | 11/2005 | Nauck et al. |
| 2005/0271555 A1 | 12/2005 | Itoh |
| 2006/0000296 A1 | 1/2006 | Salter |
| 2006/0047303 A1 | 3/2006 | Ortiz et al. |
| 2006/0219524 A1 | 10/2006 | Kelly et al. |
| 2007/0116611 A1 | 5/2007 | DeMarco |
| 2007/0210090 A1 | 9/2007 | Sixt et al. |
| 2007/0248496 A1 | 10/2007 | Bondioli et al. |
| 2007/0276558 A1 | 11/2007 | Kim |
| 2008/0012511 A1 | 1/2008 | Ono |
| 2008/0029368 A1 | 2/2008 | Komori |
| 2008/0056328 A1 | 3/2008 | Rund et al. |
| 2008/0131961 A1 | 6/2008 | Crees et al. |
| 2009/0004732 A1 | 1/2009 | LaBarre et al. |
| 2009/0022625 A1 | 1/2009 | Lee et al. |
| 2009/0081771 A1 | 3/2009 | Breidford et al. |
| 2009/0128139 A1 | 5/2009 | Drenth et al. |
| 2009/0130745 A1 * | 5/2009 | Williams ............ B01L 3/5027 |
| 2009/0142844 A1 | 6/2009 | Le Comte |
| 2009/0180931 A1 | 7/2009 | Silbert et al. |
| 2009/0322486 A1 | 12/2009 | Gerstel |
| 2010/0000250 A1 | 1/2010 | Sixt |
| 2010/0152895 A1 | 6/2010 | Dai |
| 2010/0175943 A1 | 7/2010 | Bergmann |
| 2010/0185784 A1 | 7/2010 | De Nie et al. |
| 2010/0185841 A1 * | 7/2010 | Monreal ............ G06F 13/37 |
| 2010/0186618 A1 | 7/2010 | King et al. |

(56) References Cited

U.S. PATENT DOCUMENTS

| | | |
|---|---|---|
| 2010/0255529 A1 | 10/2010 | Cocola et al. |
| 2010/0300831 A1 | 12/2010 | Pedrazzini |
| 2010/0312379 A1 | 12/2010 | Pedrazzini |
| 2011/0050213 A1 | 3/2011 | Furukawa |
| 2011/0073438 A1* | 3/2011 | Takai ............... G01N 35/026 |
| 2011/0076193 A1 | 3/2011 | Kitagawa et al. |
| 2011/0124038 A1 | 5/2011 | Bishop et al. |
| 2011/0172128 A1 | 7/2011 | Davies et al. |
| 2011/0186406 A1 | 8/2011 | Kraus et al. |
| 2011/0287447 A1 | 11/2011 | Norderhaug et al. |
| 2012/0009087 A1 | 1/2012 | Okubo |
| 2012/0037696 A1 | 2/2012 | Lavi |
| 2012/0129673 A1 | 5/2012 | Fukugaki et al. |
| 2012/0178170 A1 | 7/2012 | Van Praet |
| 2012/0211645 A1 | 8/2012 | Tullo et al. |
| 2012/0275885 A1 | 11/2012 | Furrer et al. |
| 2012/0282683 A1 | 11/2012 | Mototsu |
| 2012/0295358 A1 | 11/2012 | Ariff et al. |
| 2012/0310401 A1 | 12/2012 | Shah |
| 2012/0311297 A1* | 12/2012 | Lee ............... G06F 13/4247 |
| 2013/0101990 A1 | 4/2013 | Handique et al. |
| 2013/0153677 A1 | 6/2013 | Leen et al. |
| 2013/0180824 A1 | 7/2013 | Kleinikkink et al. |
| 2013/0263622 A1 | 10/2013 | Mullen et al. |
| 2013/0322992 A1 | 12/2013 | Pedrazzini |
| 2014/0170023 A1 | 6/2014 | Saito et al. |
| 2014/0234949 A1 | 8/2014 | Wasson et al. |
| 2015/0014125 A1 | 1/2015 | Hecht |
| 2015/0140668 A1 | 5/2015 | Mellars et al. |
| 2015/0166265 A1 | 6/2015 | Pollack et al. |
| 2015/0241457 A1 | 8/2015 | Miller |
| 2015/0273468 A1 | 10/2015 | Croquette et al. |
| 2015/0273691 A1 | 10/2015 | Pollack |
| 2015/0276775 A1 | 10/2015 | Mellars et al. |
| 2015/0316974 A1 | 11/2015 | Jeon |
| 2016/0003859 A1 | 1/2016 | Wenczel et al. |
| 2016/0025756 A1 | 1/2016 | Pollack et al. |
| 2016/0054341 A1 | 2/2016 | Edelmann |
| 2016/0229565 A1 | 8/2016 | Margner |
| 2016/0341751 A1 | 11/2016 | Huber et al. |
| 2017/0059599 A1 | 3/2017 | Riether |
| 2017/0108522 A1 | 4/2017 | Baer |
| 2017/0131307 A1 | 5/2017 | Pedain |
| 2017/0131310 A1 | 5/2017 | Volz et al. |
| 2017/0138971 A1 | 5/2017 | Heise et al. |
| 2017/0168079 A1 | 6/2017 | Sinz |
| 2017/0174448 A1 | 6/2017 | Sinz |
| 2017/0184622 A1 | 6/2017 | Sinz et al. |
| 2017/0248623 A1 | 8/2017 | Kaeppeli et al. |
| 2017/0248624 A1 | 8/2017 | Kaeppeli et al. |
| 2017/0363608 A1 | 12/2017 | Sinz |
| 2018/0067141 A1 | 3/2018 | Mahmudimanesh et al. |
| 2018/0106821 A1 | 4/2018 | Vollenweider et al. |
| 2018/0128848 A1 | 5/2018 | Schneider et al. |
| 2018/0156835 A1 | 6/2018 | Hassan |
| 2018/0188280 A1 | 7/2018 | Malinowski |
| 2018/0210000 A1 | 7/2018 | van Mierlo |
| 2018/0210001 A1 | 7/2018 | Reza |
| 2018/0217174 A1 | 8/2018 | Malinowski |
| 2018/0217176 A1 | 8/2018 | Sinz et al. |
| 2018/0224476 A1 | 8/2018 | Birrer et al. |
| 2018/0340951 A1 | 11/2018 | Kaeppell |
| 2018/0340952 A1 | 11/2018 | Kaeppeli et al. |
| 2018/0348244 A1 | 12/2018 | Ren |
| 2018/0348245 A1 | 12/2018 | Schneider et al. |
| 2019/0018027 A1 | 1/2019 | Hoehnel |
| 2019/0076845 A1 | 3/2019 | Huber et al. |
| 2019/0076846 A1 | 3/2019 | Durco et al. |
| 2019/0086433 A1 | 3/2019 | Hermann et al. |
| 2019/0094251 A1 | 3/2019 | Malinowski |
| 2019/0101468 A1 | 4/2019 | Haldar |
| 2019/0285660 A1 | 9/2019 | Kopp et al. |
| 2020/0200783 A1 | 6/2020 | Durco |

FOREIGN PATENT DOCUMENTS

| | | |
|---|---|---|
| CN | 102478791 A | 5/2012 |
| CN | 204447337 U | 7/2015 |
| DE | 3909786 A1 | 9/1990 |
| DE | 102012000665 A1 | 8/2012 |
| DE | 102011090044 A1 | 7/2013 |
| EP | 0601213 A1 | 10/1992 |
| EP | 0775650 A1 | 5/1997 |
| EP | 0916406 A2 | 5/1999 |
| EP | 1122194 A1 | 8/2001 |
| EP | 1524525 A1 | 4/2005 |
| EP | 2119643 A1 | 11/2009 |
| EP | 2148117 A1 | 1/2010 |
| EP | 2327646 A1 | 6/2011 |
| EP | 2447701 A2 | 5/2012 |
| EP | 2500871 A1 | 9/2012 |
| EP | 2502675 B1 | 2/2014 |
| EP | 2887071 A1 | 6/2015 |
| GB | 2165515 A | 4/1986 |
| JP | S56-147209 A | 11/1981 |
| JP | 60-223481 A | 11/1985 |
| JP | 61-081323 A | 4/1986 |
| JP | S61-069604 A | 4/1986 |
| JP | S61-094925 A | 5/1986 |
| JP | S61-174031 A | 8/1986 |
| JP | S61-217434 A | 9/1986 |
| JP | S62-100161 A | 5/1987 |
| JP | S63-31918 A | 2/1988 |
| JP | S63-48169 A | 2/1988 |
| JP | S63-82433 U | 5/1988 |
| JP | S63-290101 A | 11/1988 |
| JP | 1148966 A | 6/1989 |
| JP | H01-266860 A | 10/1989 |
| JP | H02-87903 A | 3/1990 |
| JP | 03-112393 A | 5/1991 |
| JP | 03-192013 A | 8/1991 |
| JP | H03-38704 Y2 | 8/1991 |
| JP | H04-127063 A | 4/1992 |
| JP | H05-69350 A | 3/1993 |
| JP | H05-142232 A | 6/1993 |
| JP | H05-180847 A | 7/1993 |
| JP | 06-26808 A | 2/1994 |
| JP | H06-148198 A | 5/1994 |
| JP | 06-156730 A | 6/1994 |
| JP | 06-211306 A | 8/1994 |
| JP | 07-228345 A | 8/1995 |
| JP | 07-236838 A | 9/1995 |
| JP | H07-301637 A | 11/1995 |
| JP | H09-17848 A | 1/1997 |
| JP | H11-083865 A | 3/1999 |
| JP | H11-264828 A | 9/1999 |
| JP | H11-304812 A | 11/1999 |
| JP | H11-326336 A | 11/1999 |
| JP | 2000-105243 A | 4/2000 |
| JP | 2000-105246 A | 4/2000 |
| JP | 2001-124786 A | 5/2001 |
| JP | 2001-240245 A | 9/2001 |
| JP | 2005-001055 A | 1/2005 |
| JP | 2005-249740 A | 9/2005 |
| JP | 2006-106008 A | 4/2006 |
| JP | 2007-309675 A | 11/2007 |
| JP | 2007-314262 A | 12/2007 |
| JP | 2007-322289 A | 12/2007 |
| JP | 2009-036643 A | 2/2009 |
| JP | 2009-062188 A | 3/2009 |
| JP | 2009-145188 A | 7/2009 |
| JP | 2009-300402 A | 12/2009 |
| JP | 2010-243310 A | 10/2010 |
| JP | 2010-271204 A | 12/2010 |
| JP | 2011-209004 A | 10/2011 |
| JP | 2013-172009 A | 2/2013 |
| JP | 2013-190400 A | 9/2013 |
| SU | 685591 A1 | 9/1979 |
| WO | 1996/036437 A1 | 11/1996 |
| WO | 2003/042048 A3 | 5/2003 |
| WO | 2007/003780 A1 | 1/2007 |
| WO | 2007/024540 A1 | 3/2007 |
| WO | 2008/123594 A2 | 10/2008 |

(56) References Cited

FOREIGN PATENT DOCUMENTS

| WO | 2008/133708 A1 | 11/2008 |
| --- | --- | --- |
| WO | 2009/002358 A1 | 12/2008 |
| WO | 2010/042722 A1 | 4/2010 |
| WO | 2012/170636 A1 | 7/2010 |
| WO | 2010/087303 A1 | 8/2010 |
| WO | 2010/129715 A1 | 11/2010 |
| WO | 2012/158520 A1 | 11/2012 |
| WO | 2012/158541 A1 | 11/2012 |
| WO | 2013/064656 A1 | 5/2013 |
| WO | 2013/152089 A1 | 10/2013 |
| WO | 2013/169778 A1 | 11/2013 |
| WO | 2013/177087 A2 | 11/2013 |
| WO | 2013/177163 A1 | 11/2013 |
| WO | 2014/059134 A1 | 4/2014 |
| WO | 2014/071214 A1 | 5/2014 |
| WO | 2015/104263 A2 | 7/2015 |

OTHER PUBLICATIONS

International Search Report dated Sep. 1, 2017, in Application No. PCT/EP2017/063523, 3 pp.

Li, Huizhang and MA, Yan, An Application of Sample Management System in Laboratory, 2012, p. 52, English Abstract.

Zhang, Hua et al., Synchronization of Sampled-data Networked Harmonic Oscillators With Controller Failure and Communication Time Delays, 25th Chinese Control and Decision Conference (CCDC), 2013, pp. 2556-2561, China Academic Journal Electronic Publishing House.

\* cited by examiner

LABORATORY SAMPLE DISTRIBUTION SYSTEM AND METHOD OF OPERATING A LABORATORY SAMPLE DISTRIBUTION SYSTEM

CROSS-REFERENCE TO RELATED APPLICATIONS

This application is a continuation of PCT/EP2017/063523, filed Jun. 2, 2017, which is based on and claims priority to EP 16173771.3, filed Jun. 9, 2016, which is hereby incorporated by reference.

BACKGROUND

The present disclosure generally relates to a laboratory sample distribution system and to a method of operating a laboratory sample distribution system.

There is a need for a laboratory sample distribution system and a method of operating a laboratory sample distribution system that is highly scalable and modular.

SUMMARY

According to the present disclosure, a laboratory sample distribution system is disclosed. The laboratory sample distribution system can comprise a number of sample container carriers and a central controller. The central controller can comprise a network interface. The laboratory sample distribution system can also comprise a number of transport modules. Each transport module can comprise a transport surface. The transport surfaces of the transport modules together can form a transport plane. Each transport module can also comprise a controllable driver arranged below the transport surface and configured to move sample container carriers on the transport surface and a control unit for controlling the driver. The control unit can comprise a network interface. The central controller and the control units of the transport modules can be connected with one another by their corresponding network interfaces. The control unit can comprise a first addressing terminal and a second addressing terminal. The addressing terminals of the control units can be connected with one another sequentially in a daisy chain topology. The first addressing terminal of the control unit being the first control unit in the sequence can be connected to a first reference potential and the second addressing terminal of the control unit being the last control unit in the sequence can be connected to a second reference potential. The first addressing terminals and the second addressing terminals of the control units can be configured as input terminals or output terminals.

Accordingly, it is a feature of the embodiments of the present disclosure to provide for a laboratory sample distribution system and a method of operating a laboratory sample distribution system that is highly scalable and modular. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
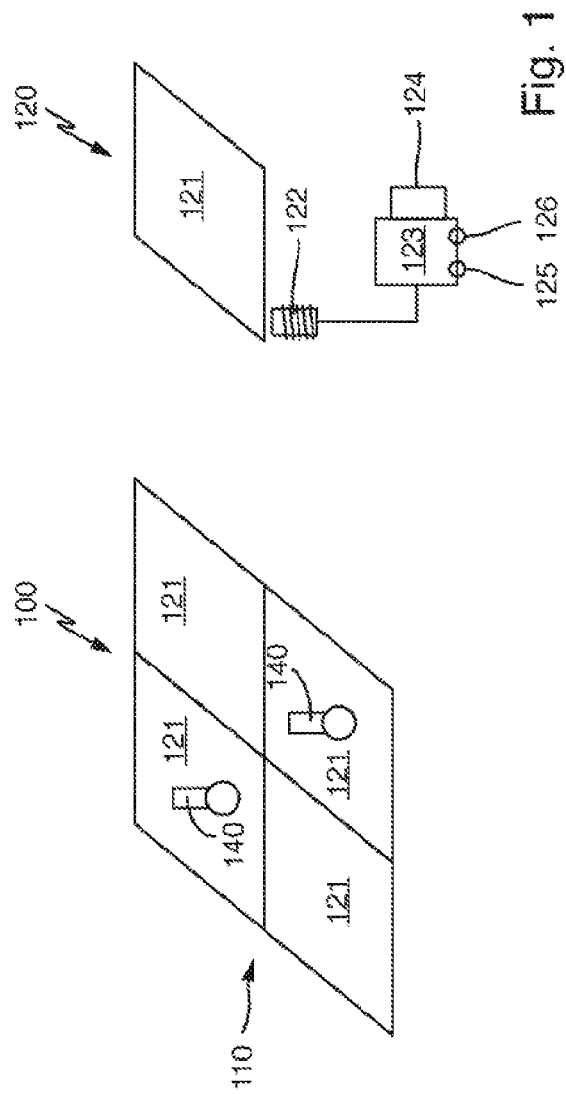
FIG. 1 illustrates schematically a laboratory sample distribution system having a number of transport modules according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A laboratory sample distribution system can comprise a number (e.g., 2 to 2000) of sample container carriers configured to carry a sample container, typically a sample tube comprising a medical sample.

The laboratory sample distribution system can further comprise a central controller having a network interface. The central controller may e.g., be incorporated in form of a personal computer. The network interface can be configured to be coupled to a network and e.g., can comprise two network terminals, wherein two electric bus wires can be connected to the network terminals.

The laboratory sample distribution system can further comprise a number (e.g., 2 to 500) of transport modules.

Each transport module can comprise a planar transport surface. The transport surfaces of the transport modules can be arranged adjacent to one another to form a transport plane for the sample container carriers.

Each transport module can further comprise a controllable driver. The driver can be arranged below the transport surface of a respective transport module. The driver can be configured to move sample container carriers on the transport surface, e.g., by generating a magnetic field that can be time and position dependent. The magnetic field may interact with a magnetically active element, e.g., a permanent magnet, that can be part of the sample container carrier.

Each transport module can further comprise a control unit for controlling the driver. The control unit may e.g., be embodied as a microcontroller. The control unit can comprise a network interface, e.g., including network terminals of the microcontroller.

The central controller and the control units of the transport modules can be connected with one another by their corresponding network interfaces. The network interfaces may e.g., be electrically coupled by electrical wires to enable a data communication between the central controller and the control units. The central controller and the control units may be connected with one another by a field bus. Reference is further made to the relevant technical literature regarding field buses.

Each control unit can comprise a first addressing terminal and a second addressing terminal, e.g., being embodied as ports of the microcontroller.

The first addressing terminals and the second addressing terminals of the respective control units can be configurable as input terminals or output terminals. The first addressing terminals and the second addressing terminals of the respective control units may e.g., be embodied as so called General-purpose input/output (GPIO), i.e., a generic pin on an integrated circuit whose behavior, including whether it is an input or output pin, can be controllable at run time. If configured as an output, the addressing terminals may operate as open collector or open drain terminals.

The addressing terminals of the control units can be connected with one another sequentially in a daisy chain topology. The daisy chain topology can be a wiring scheme in which multiple devices can be wired together in sequence (or in a ring, not embodied). According to an embodiment, the first addressing terminal of the control unit can be the first control unit in the daisy chain sequence and can be connected to a first reference potential, e.g., ground (GND). The second addressing terminal of the control unit can be the first control unit in the daisy chain sequence and can be connected to the first terminal of the control unit being the second control unit in the daisy chain sequence. The second addressing terminal of the control unit can be the second control unit in the daisy chain sequence and can be connected to the first terminal of the control unit can be the third control unit in the daisy chain sequence, and so forth. Finally, the second addressing terminal of the control unit can be the last control unit in the sequence and can be connected to a second reference potential.

The first reference potential and the second reference potential may be identical, e.g., ground potential.

The network interface of the central controller and the network interfaces of the control units may be embodied as RS485 network interfaces. Reference is further made to the relevant technical literature regarding the RS485 standard.

The method of operating the laboratory sample distribution system can comprise the following.

First, the first addressing terminals and the second addressing terminals of the respective control units can be respectively configured as input terminals.

Then, the states of the first addressing terminals and of the second addressing terminals of the respective control units can be read.

A first address can be assigned to the control unit, which can have a predetermined initializing state (logical state) at its first addressing terminal, e.g., the logical state 0.

In case of an error free operation, the first addressing terminal of the control unit can be the first control unit in the sequence and can be connected to the first reference potential. The first reference potential can correspond to the predetermined initializing state. The respective first addressing terminals of the remaining control units can see a potential which can differ from the first reference potential. For that purpose, pull-up-resistors or pull-down-resistors may be provided at each connection between the respective first and second addressing terminals within the daisy-chain topology ensuring that a defined potential is present if the first and second addressing terminals are configured as inputs. Concluding, only the first control unit in the sequence can read the predetermined initializing state at its first addressing terminal. The remaining control units can read another or opposite state at their corresponding first addressing terminals. Therefore, this behavior can be used to assign the first address to the first control unit in the daisy chain.

Then, the second addressing terminal of the control unit having the first address can be configured as an output terminal and a predetermined potential can be output at the second addressing terminal of the control unit having the first address. The predetermined potential output at the second addressing terminal may be the same as the first reference potential, e.g., GND. Typically, the potential at the second addressing terminal can be held constant by a pull-up or a pull-down resistor when the second addressing terminal is configured as an input. When the second addressing terminal is configured as an output and the predetermined potential is output at the second addressing terminal, the potential can change to the predetermined potential. If e.g., a pull-up resistor is used, the potential can change from a supply voltage to GND.

This can cause the second control unit in the daisy chain to detect a change of the state at its first addressing terminal and, successively, a second address can be assigned to the second control unit.

These steps can be repeated for the control units in the sequence following the control unit having the second address until the last control unit in the chain is reached.

The last control unit can be determined based on the fact that the potential at its second addressing terminal can be the second reference potential at the beginning of the addressing sequence.

Self-evidently, the above steps can be reversed, thus assigning the first address to the control unit having the second reference potential at its second addressing terminal at the beginning of the addressing sequence.

Referring initially to FIG. 1, FIG. 1 schematically shows a laboratory sample distribution system 100. The laboratory sample distribution system 100 can comprise a number of sample container carriers 140 being movably arranged on a transport plane 110. The transport plane 110 can be formed of four transport surfaces 121 arranged adjacent to one another. The transport surfaces 121 can be part of four transport modules 120.

Each transport module 120 can further comprise a controllable driver 122 in the form of electro-magnets arranged in rows and columns under the transport surface 121 and configured to move sample container carriers 140 on the transport surface 121. For the purpose of explanation, only a single driver 122 is depicted.

The sample container carriers 140 can comprise a permanent magnet interacting with a magnetic field generated by the electro-magnets 122 such that a desired magnetic driving force can be applied to the sample container carriers 140. Regarding the driver 122 and the basic mechanical arrangement of the transport modules, reference is also made to the disclosure of WO 2013/064656 A1, which is hereby incorporated by reference.

Each transport module 120 can comprise a control unit 123 for controlling the drive means 122.

Figure 2:
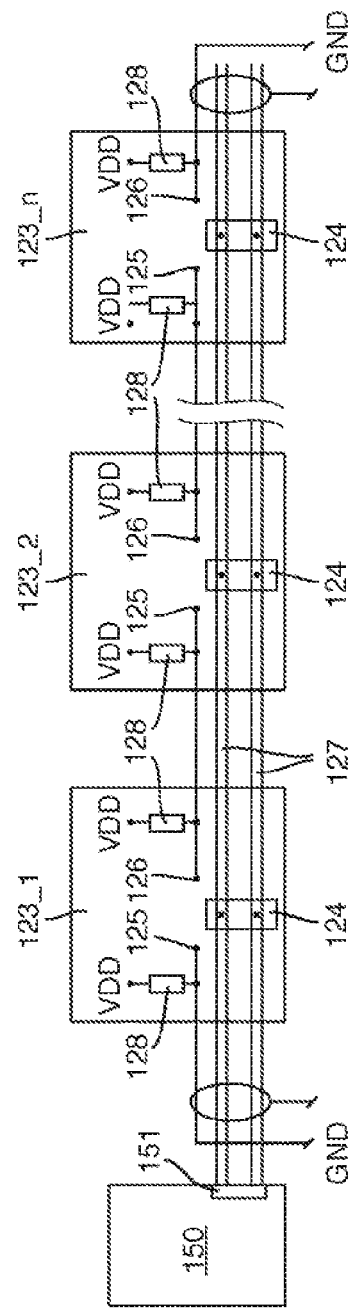
FIG. 2 illustrates schematically a wiring scheme connecting a central controller and a plurality of control units of the laboratory sample distribution system shown in FIG. 1 according to an embodiment of the present disclosure.

Now referring to FIG. 2, the laboratory sample distribution system 100 can comprise a central controller 150 in the form of a personal computer having a RS485 network interface 151.

The control units 123_1 to 123_n can respectively comprise a RS485 network interface 124 having two connectors. The central controller 150 and the control units 123_1 to 123_n of the transport modules 120 can be connected with one another by their corresponding network interfaces 151, 124, respectively. For that purpose, the network interfaces 151, 124 can be conventionally electrically connected by two electrical bus wires 127.

Each control unit 123_1 to 123_n can comprise a first addressing terminal 125 and a second addressing terminal 126. The addressing terminals 125, 126 of the control units 123_1 to 123_n can be electrically connected with one another sequentially in a daisy chain topology, as depicted.

The first addressing terminal 125 of the control unit 123_1 being the first in the sequence can be connected to a reference potential, namely GND. The second addressing terminal 126 of the control unit 123_n being the last in the sequence can also be connected to the reference potential GND, e.g., by a terminator element.

The respective first addressing terminals 125 and the respective second addressing terminals 126 of the control units 123_1 to 123_n can be configured as input terminals or output terminals.

Each electrical connection between a respective first addressing terminal 125 and second addressing terminal 126 can be electrically pulled up to a supply voltage VDD by corresponding pull-up resistors 128 comprised in each control unit 123_1 to 123_n. The addressing terminals 125 and 126 may be configured as open drain or open collector outputs such that the terminals may pull the potential at the output to GND or may have a high impedance state such that the potential can be pulled up to VDD.

The electrical wiring between the control units 123_1 to 123_n may e.g., be embodied by connection cables having a connector at each end, e.g., an 8P8C connector. The control units may be connected to their neighbors by two connection cables, one connection cable to the left neighbor and one connection cable to the right neighbor. The connection cable used to connect the control unit 123_1 to the central controller 150 may differ from the remaining connection cables and may electrically connect the first addressing terminal 125 to GND.

The network addresses of the control units 123_1 to 123_n used to communicate by the network interface, i.e., the RS485 network, can be assigned as follows.

At the beginning, e.g., after a reboot of the laboratory sample distribution system 100, the respective first addressing terminals 125 and the respective second addressing terminals 126 of the control units 123 can be configured as input terminals.

The control units 123_1 to 123_n can respectively read the states of their first addressing terminals 125 and of the second addressing terminals 126.

The first addressing terminal 125 of the control unit 123_1 can read a state corresponding to GND, i.e., a predetermined initializing state. The first addressing terminals 125 of the remaining control units 123_2 to 123_n can read a different state corresponding to VDD, i.e., not the predetermined initializing state.

Therefore, a first address can be assigned to the control unit 123_1.

Subsequently, the control unit 123_1 can configure its second addressing terminal 126 as an output terminal and can pull the output to GND.

As a consequence, the control unit 123_2 can detect a change of the state at its first addressing terminal 126 such that a second address can be assigned to the control unit 123_2.

Subsequently, the control unit 123_2 can configure its second addressing terminal 126 as an output terminal and can pull the output to GND.

As a consequence, the control unit following control unit 123_2 can detect a change of the state at its first addressing terminal 125 such that a third address can be assigned to this control unit.

These steps can be repeated until an address n is assigned to the last control unit 123_n.

The last control unit 123_n can be identified by the fact that its second addressing terminal 126 can constantly read the predetermined initializing state.

Self-evidently, it can be possible to reverse the address assignment scheme from "left to right" to "right to left" such the first address can be assigned to the last control unit 123_n and so on.

In case of an error, the addresses may e.g., be assigned beginning from one side until no further address can be assigned in the given direction, e.g., because a control module is defective, the wiring is defective, and the like. If such an error is detected, the further addresses may successively be assigned from the other direction.

After the addresses have been assigned to the control units 123_1 to 123_n, the central controller 150 may e.g., transmit commands to the control units 123_1 to 123_n.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A laboratory sample distribution system, the laboratory sample distribution system comprising:
   a number of sample container carriers;
   a central controller, wherein the central controller comprises a network interface; and
   a number of transport modules, wherein each transport module comprises,
      a transport surface, wherein the transport surfaces of the transport modules together form a transport plane,
      a controllable driver arranged below the transport surface and configured to move sample container carriers on the transport surface, and
      a control unit for controlling the driver, wherein the control unit comprises a network interface,
   wherein the control unit comprises a first addressing terminal and a second addressing terminal, wherein the first addressing terminal and the second addressing terminals of the control units are connected with one another sequentially in a daisy chain topology, wherein the first addressing terminal of the control unit being the first control unit in the sequence is connected to a first reference potential and the second addressing terminal of the control unit being the last control unit in the sequence is connected to a second reference potential, and wherein the first addressing terminals and the second addressing terminals of the control units are configured as input terminals or output terminals, wherein the states of the first addressing terminals and of the second addressing terminals of the control units are read; wherein a first address is assigned to the control unit having a predetermined initializing state at its first addressing terminal, and wherein the last control unit is identified when its second address terminal is the second reference potential at the beginning of the sequence.

2. The laboratory sample distribution system according to claim 1, wherein the first reference potential and the second reference potential are identical.

3. The laboratory sample distribution system according to claim 2, wherein the first reference potential and the second reference potential are ground potential.

4. The laboratory sample distribution system according to claim 1, wherein the network interface of the central controller and the network interfaces of the control units are RS485 network interfaces.

5. A method of operating a laboratory sample distribution system, wherein the laboratory sample distribution system comprises a number of sample container carriers, a central controller, wherein the central controller comprises a network interface, and a number of transport modules, wherein each transport module comprises a transport surface, wherein the transport surfaces of the transport modules together form a transport plane, a controllable driver arranged below the transport surface and configured to move sample container carriers on the transport surface, and a control unit for controlling the driver, wherein the control unit comprises a network interface, wherein the control unit comprises a first addressing terminal and a second addressing terminal, wherein the first addressing terminal and the second addressing terminals of the control units are connected with one another sequentially in a daisy chain topology, and wherein the first addressing terminal of the control unit being the first control unit in the sequence is connected to a first reference potential and the second addressing terminal of the control unit being the last control unit in the sequence is connected to a second reference potential, the method comprising:

configuring the first addressing terminals and the second addressing terminals of the control units as input terminals;

reading the states of the first addressing terminals and of the second addressing terminals of the control units;

assigning a first address to the control unit having a predetermined initializing state at its first addressing terminal;

configuring the second addressing terminal of the control unit having the first address as an output terminal;

outputting a predetermined potential at the second addressing terminal of the control unit having the first address;

assigning a second address to the control unit detecting a change of the state at its first addressing terminal; and repeating the steps for the control units in the sequence following the control unit having the second address until the last control unit in the daisy chain is reached, wherein the last control unit is determined when its second address terminal is the second reference potential at the beginning of the sequence.

* * * * *